May 22, 1923.

W. DUBILIER 1,455,781

ELECTRICAL CONDENSER

Filed Dec. 7, 1921

INVENTOR
William Dubilier
BY Percy Freeman
ATTORNEY

Patented May 22, 1923.

1,455,781

UNITED STATES PATENT OFFICE.

WILLIAM DUBILIER, OF NEW YORK, N. Y., ASSIGNOR TO DUBILIER CONDENSER & RADIO CORPORATION, A CORPORATION OF DELAWARE.

ELECTRICAL CONDENSER.

Application filed December 7, 1921. Serial No. 520,594.

*To all whom it may concern:*

Be it known that I, WILLIAM DUBILIER, a citizen of the United States, and resident of New York city, in the county of New York and State of New York, have invented certain new and useful Improvements in Electrical Condensers, of which the following is a specification.

The object of this invention is in the provision of an improved condenser or electrostatic accumulator in which induction takes place through its mass, causing a difference of potential energy at its terminals.

Such condensers are usually composed of a plurality of thin sheet metal or metallic foil layers separated by a non-conducting material, such as mica, paraffine paper, etc., the opposite layers forming terminals from which current is received and delivered.

In condensers in which mica is used as the dielectric, where the size of the mica sheet is limited for commercial reasons, if large capacities are required, say for example one microfarad, the number of layers and sheets must be increased.

A large number of sheets must be built up into a single unit and if mica sheets of for instance 2 x 3 inches by .003 be used, a one microfarad unit will be about two inches thick.

With the use of commercial sizes of mica in order to get a microfarad, almost 1,000 sheets will be used in the unit. We then will have about 500 layers piled on one side electrically connected together and 500 layers on the other side of the pile electrically connected together.

If there should be one defective mica sheet in this pile which for some reason or other should break down after the unit is assembled, the entire condenser becomes defective and it becomes expensive to repair.

If however, we should make small groups or sections of say 50 layers and then connect these 20 groups or sections in one pile with insulated separators between each group, and the group containing the defective sheet should break down, the whole unit of course will be defective but it will be much easier to repair by taking out that single group or section which contained the defective sheet.

If however, these groups or sections were connected in parallel through a thin or light conductor which is easily fusible, as for instance a small lead wire, then if one section or a sheet in one section should break down, all the remaining sections that are connected in parallel will momentarily discharge through that broken down section with the result that a heavy rush of current will surge through that single section, it acting somewhat the same as a spark gap across a condenser, with the result that the heavy current will rush through the single light conductor connecting the defective section.

This conductor will fuse thus opening the circuit to the defective group or section, similar to the action of a fuse in an electric light circuit, automatically disconnecting the defective section, with the result that the remaining sections remain in circuit and continue to function.

This invention is designed to overcome the defects as above stated, in that, should the insulation fail between any of the plates or sheets constituting one of the several series or groups of condenser elements, those remaining in groups will continue to function effectively.

These objects are attained by the novel design and arrangement of parts hereinafter described and shown in the accompanying drawing, forming a material part of this disclosure, and in which.

Figure 1:
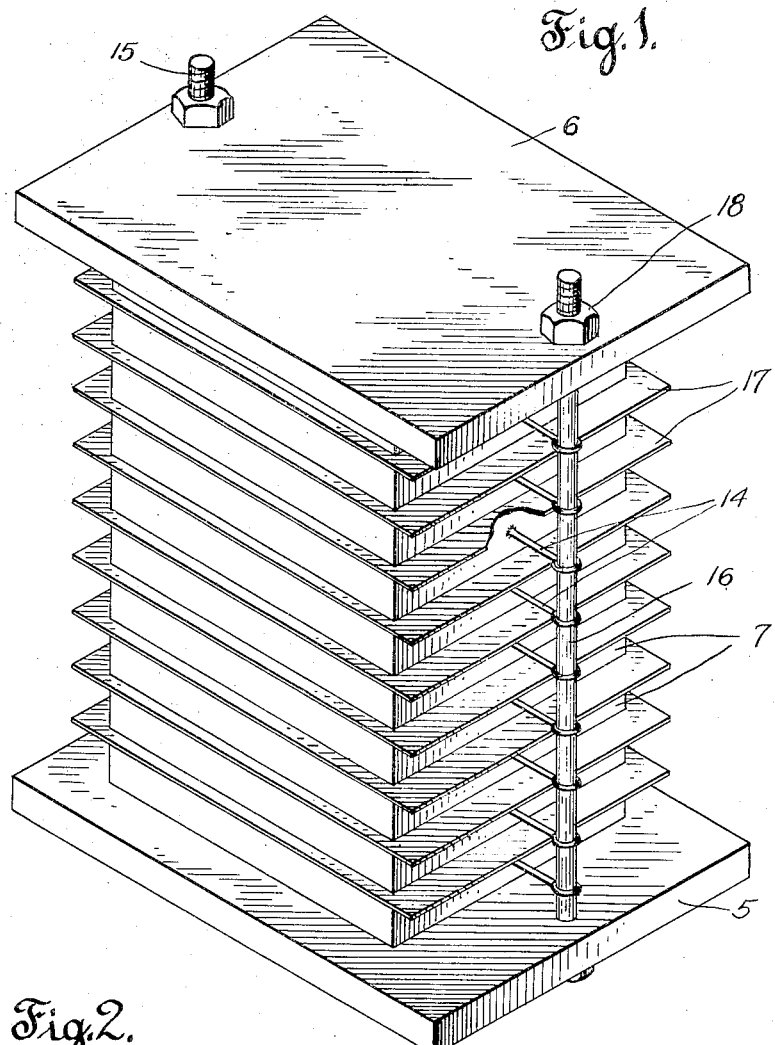
Fig. 1 is a perspective view of a condenser made in accordance with the invention, a part being broken away to show the construction.
Figure 2:
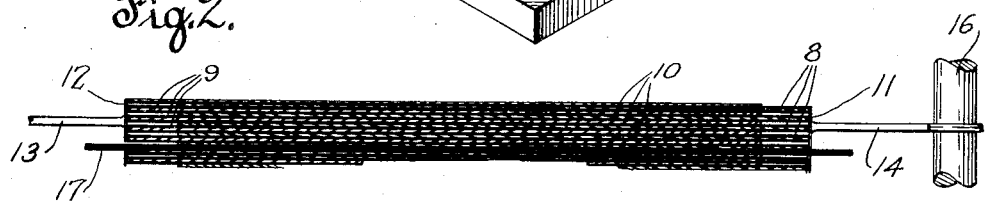
Fig. 2 is an enlarged fragmentary sectional view showing portions of the grouped plates and connections.

In this drawing, the numeral 5 designates the base of the device, the same being shown as a rectangular plate of non-conducting material, and 6 a similar top cover plate.

Resting on the upper surface of the base is the first group of condenser elements, generally designated by the numeral 7, consisting of indefinite numbers of thin metal plates 8, respectively arranged in staggered order with regard to their ends and having interposed between each lamination, a sheet of insulating material 10 imperforate and preferably slightly larger than the metal plates.

The extending metal laminations are connected one to the other, on opposite sides, by solder caps 11 and 12 and current taps of fusible wires 13 and 14 are soldered centrally of each of the opposed units and extend outwardly in a manner adapted to be connected to bus bars 15 and 16.

A plurality of like condenser groups are arranged one above the other and separated by insulation plates 17 having a surface area considerably larger than the metal plate groups 7.

The current carrying bars 15 and 16 are threaded at their ends which are passed through the plates 5 and 6 and are provided with nuts 18 for clamping the several groups in a tight unitary pile, the extending ends of the bars being also used in making electrical connections.

In operation, should any of the insulating elements 10 fail, by fracture, disintegration or otherwise, the condenser plate elements 8 and 9 may be brought into electrical engagement, short circuiting the plates in that particular group and causing the connections 13 and 14, either or both to fuse, which automatically cuts out that group but in no wise interferes with the proper functioning of the remaining groups.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:—

1. A condenser unit comprising a plurality of condenser sections connected in parallel through a light fusible conductor.

2. A condenser comprising a plurality of condenser sections arranged in parallel, and means permitting one or more of said sections to become inoperative without affecting the remaining sections.

3. A condenser comprising a pile of condenser elements arranged in groups, conductors for said condenser, and independent fusible connections between each group and its corresponding conductor, whereby any of said groups may be rendered inoperative without affecting the action of the remaining groups.

4. A condenser comprising a plurality of metallic plates arranged in alternate relation, the alternate plates being in electrical connection, insulating elements between each of said plates, insulating separators between groups of said plates forming a pile, a pair of pole bars, and fuse wire connections between each group of alternate plates and said pole bars, said connections being fusible upon a short circuit occurring in the group to which it is attached.

Signed at New York, in the county of New York and State of New York.

WILLIAM DUBILIER.